(12) United States Patent
Dobbins et al.

(10) Patent No.: US 12,555,484 B2
(45) Date of Patent: *Feb. 17, 2026

(54) SYSTEMS AND METHODS FOR DIMINISHING VEHICLE CONTRAILS

(71) Applicant: Honeywell International Inc., Charlotte, NC (US)

(72) Inventors: Thomas Dobbins, Watertown, MN (US); Patrick Conry, Minnetonka, MN (US); Matthew Wiebold, Mankato, MN (US)

(73) Assignee: Honeywell International Inc., Charlotte, NC (US)

( * ) Notice: Subject to any disclaimer, the term of this patent is extended or adjusted under 35 U.S.C. 154(b) by 198 days.

This patent is subject to a terminal disclaimer.

(21) Appl. No.: 18/457,767

(22) Filed: Aug. 29, 2023

(65) Prior Publication Data

US 2025/0078667 A1 Mar. 6, 2025

(51) Int. Cl.
*G08G 5/34* (2025.01)
*G01S 17/95* (2006.01)
*G08G 5/26* (2025.01)
*G08G 5/55* (2025.01)
(Continued)

(52) U.S. Cl.
CPC .............. *G08G 5/34* (2025.01); *G01S 17/95* (2013.01); *G08G 5/26* (2025.01); *G08G 5/55* (2025.01); *G08G 5/59* (2025.01); *G08G 5/76* (2025.01)

(58) Field of Classification Search
CPC .. G08G 5/34; G08G 5/26; G08G 5/55; G08G 5/59; G08G 5/76; G08G 5/21; G08G 5/32; G01S 17/95
See application file for complete search history.

(56) References Cited

U.S. PATENT DOCUMENTS 5,270,929 A * 12/1993 Paulson ............... G01S 17/95
356/342
5,648,601 A * 7/1997 Katoh ............... G01N 33/007
73/1.06
(Continued)

FOREIGN PATENT DOCUMENTS

CA 2789965 A1 * 9/2011 ............... G08G 5/55
CN 102915652 A * 2/2013 ............. G08G 1/166
(Continued)

OTHER PUBLICATIONS

"Remote sensing of atmospheric wind velocities using solid-state and CO/sub 2/ coherent laser systems;" Huffaker et.al., Proceedings of the IEEE (vol. 84, Issue: 2, 1996, pp. 181-204); Feb. 1, 1996. (Year: 1996).*

(Continued)

*Primary Examiner* — Khoi H Tran
*Assistant Examiner* — Jorge O Peche
(74) *Attorney, Agent, or Firm* — Fogg & Powers LLC

(57) ABSTRACT

A technological improvement to a system for vehicle navigation is provided. The improvement diminishes a contribution to global climate change, e.g., global warming, by generating a flight path (generated flight path) or modifying the flight path (modified flight path) of a vehicle to avoid an atmospheric region in which the vehicle would create a contrail if the vehicle travelled through the atmospheric region.

14 Claims, 5 Drawing Sheets

(51) Int. Cl.
  *G08G 5/59* (2025.01)
  *G08G 5/76* (2025.01)

(56) References Cited

U.S. PATENT DOCUMENTS

| | | | | |
|---|---|---|---|---|
| 5,714,948 | A * | 2/1998 | Farmakis | G01S 5/0072 |
| | | | | 340/961 |
| 6,184,816 | B1 * | 2/2001 | Zheng | G01S 7/003 |
| | | | | 340/963 |
| 6,377,202 | B1 * | 4/2002 | Kropfli | G01S 7/024 |
| | | | | 342/195 |
| 6,456,226 | B1 * | 9/2002 | Zheng | G01S 13/87 |
| | | | | 340/963 |
| 6,563,452 | B1 * | 5/2003 | Zheng | G01S 7/06 |
| | | | | 342/52 |
| 7,458,544 | B1 * | 12/2008 | Sarigul-Klijn | B64D 1/12 |
| | | | | 244/137.4 |
| 7,702,427 | B1 * | 4/2010 | Sridhar | G08G 5/80 |
| | | | | 701/16 |
| 7,724,177 | B2 | 5/2010 | Bunch et al. | |
| 7,933,002 | B2 | 4/2011 | Halldorsson | |
| 8,931,727 | B2 * | 1/2015 | Engblom | G05D 1/105 |
| | | | | 244/900 |
| 9,070,284 | B2 | 6/2015 | Inokuchi et al. | |
| 9,310,477 | B1 * | 4/2016 | Sampigethaya | G01S 13/91 |
| 9,483,951 | B1 * | 11/2016 | McCusker | B64D 43/00 |
| 9,718,557 | B2 * | 8/2017 | Zubairi | B64D 45/00 |
| 9,720,082 | B1 * | 8/2017 | Dana | G06T 11/60 |
| 9,823,347 | B1 * | 11/2017 | Koenigs | G01S 7/22 |
| 9,864,055 | B1 * | 1/2018 | Sishtla | B64D 15/20 |
| 10,429,511 | B2 | 10/2019 | Bosetti et al. | |
| 10,431,021 | B2 * | 10/2019 | Murase | F02D 41/00 |
| 11,385,346 | B2 * | 7/2022 | Song | G01S 13/933 |
| 11,514,799 | B2 | 11/2022 | Ladurini et al. | |
| 11,697,495 | B1 * | 7/2023 | Henck | B64C 13/503 |
| | | | | 244/7 R |
| 11,827,375 | B1 * | 11/2023 | Henck | B64D 43/00 |
| 2006/0069497 | A1 * | 3/2006 | Wilson | G05D 1/0044 |
| | | | | 342/36 |
| 2006/0139657 | A1 * | 6/2006 | Baillon | G01S 17/95 |
| | | | | 356/519 |
| 2007/0073486 | A1 * | 3/2007 | Tillotson | G01W 1/08 |
| | | | | 702/3 |
| 2007/0162197 | A1 * | 7/2007 | Fleming | G01W 1/02 |
| | | | | 701/3 |
| 2007/0171396 | A1 * | 7/2007 | Harris | G01S 17/95 |
| | | | | 356/28 |
| 2009/0151143 | A1 * | 6/2009 | Jones | B64F 5/10 |
| | | | | 29/407.1 |
| 2009/0157288 | A1 * | 6/2009 | Bailey | G08G 5/34 |
| | | | | 701/122 |
| 2009/0157363 | A1 * | 6/2009 | Barnes | B64F 5/00 |
| | | | | 703/8 |
| 2009/0310118 | A1 * | 12/2009 | Halldorsson | G01P 5/26 |
| | | | | 356/28 |
| 2009/0319164 | A1 * | 12/2009 | Harrington | G08G 5/727 |
| | | | | 701/120 |
| 2010/0110431 | A1 * | 5/2010 | Ray | B64D 15/20 |
| | | | | 356/342 |
| 2010/0131207 | A1 * | 5/2010 | Lippert | G01S 17/95 |
| | | | | 702/49 |
| 2011/0164783 | A1 * | 7/2011 | Hays | G01S 17/003 |
| | | | | 356/519 |
| 2011/0166836 | A1 * | 7/2011 | Kaplan | G08G 5/56 |
| | | | | 703/2 |
| 2012/0169053 | A1 * | 7/2012 | Tchoryk, Jr. | G01S 7/491 |
| | | | | 356/28 |
| 2012/0274937 | A1 * | 11/2012 | Hays | G01S 17/95 |
| | | | | 356/450 |
| 2014/0358415 | A1 * | 12/2014 | McDonald | G08G 5/727 |
| | | | | 701/120 |
| 2015/0339930 | A1 * | 11/2015 | Mccann | G08G 5/32 |
| | | | | 701/528 |
| 2015/0379875 | A1 * | 12/2015 | Sharma | G08G 5/55 |
| | | | | 701/408 |
| 2016/0202283 | A1 * | 7/2016 | Wang | G01S 7/4814 |
| | | | | 356/28 |
| 2016/0275801 | A1 * | 9/2016 | Kopardekar | G08G 5/55 |
| 2016/0328978 | A1 * | 11/2016 | Ramaker | G01C 21/20 |
| 2018/0182252 | A1 * | 6/2018 | Govindillam K | G07C 5/008 |
| 2020/0365038 | A1 * | 11/2020 | Eaves | G08G 5/32 |
| 2020/0380804 | A1 * | 12/2020 | Nakhjavani | G06F 18/25 |
| 2021/0020049 | A1 * | 1/2021 | Nathan | G08G 5/26 |
| 2021/0073692 | A1 * | 3/2021 | Saha | G08B 21/16 |
| 2021/0247513 | A1 * | 8/2021 | Song | G08G 5/80 |
| 2021/0319705 | A1 | 10/2021 | Furumoto | |
| 2021/0350716 | A1 * | 11/2021 | Gariel | G08G 5/56 |
| 2022/0028287 | A1 * | 1/2022 | Durant | G06Q 10/047 |
| 2022/0157175 | A1 * | 5/2022 | Jing | G08G 5/55 |
| 2022/0189324 | A1 * | 6/2022 | Singh | G08G 5/54 |
| 2022/0215766 | A1 | 7/2022 | Lisoski et al. | |
| 2022/0230547 | A1 * | 7/2022 | Miller | G08G 5/32 |
| 2022/0238025 | A1 * | 7/2022 | McCann | G08G 5/59 |
| 2022/0267014 | A1 * | 8/2022 | Wang | B64D 15/20 |
| 2022/0289403 | A1 * | 9/2022 | Afrasiabi | G06V 20/64 |
| 2023/0020614 | A1 * | 1/2023 | Dugas | B64D 11/0015 |
| 2023/0103615 | A1 | 4/2023 | Ward et al. | |
| 2023/0386261 | A1 * | 11/2023 | Foland | B64U 50/30 |
| 2023/0386345 | A1 * | 11/2023 | Wiegman | G08G 5/21 |
| 2023/0410663 | A1 * | 12/2023 | Henck | G08G 5/26 |
| 2024/0021849 | A1 * | 1/2024 | Taylor | H01M 8/04492 |
| 2024/0028053 | A1 * | 1/2024 | Sherry | G06Q 30/018 |
| 2024/0046805 | A1 * | 2/2024 | Jung | G08G 5/53 |
| 2024/0051679 | A1 * | 2/2024 | Bosson | G08G 5/53 |
| 2024/0257653 | A1 * | 8/2024 | Lee | G08G 5/53 |
| 2024/0312351 | A1 * | 9/2024 | Van Tulder | G08G 5/727 |
| 2024/0326846 | A1 * | 10/2024 | Thrasher | B60W 50/04 |
| 2024/0371276 | A1 * | 11/2024 | Bosson | G08G 5/26 |
| 2024/0371279 | A1 * | 11/2024 | Bosson | G08G 5/54 |
| 2024/0420583 | A1 * | 12/2024 | Kadavil | G08G 5/727 |
| 2025/0078667 | A1 * | 3/2025 | Dobbins | G08G 5/59 |
| 2025/0102648 | A1 * | 3/2025 | Dobbins | G02B 26/02 |
| 2025/0259554 | A1 * | 8/2025 | Durant | G08G 5/22 |

FOREIGN PATENT DOCUMENTS

| | | | | |
|---|---|---|---|---|
| CN | 114927009 | A * | 8/2022 | G01W 1/02 |
| CN | 115620419 | A * | 1/2023 | B64D 11/0015 |
| CN | 118426480 | A * | 8/2024 | G08G 5/55 |
| DE | 102021109848 | A1 | 10/2022 | |
| EP | 2157454 | A3 | 6/2016 | |
| EP | 2157453 | B1 | 11/2017 | |
| EP | 3961012 | A1 * | 3/2022 | F02C 3/20 |
| EP | 4229493 | B1 * | 11/2024 | G05D 1/621 |
| GB | 2588216 | A * | 4/2021 | H01M 8/04156 |
| GB | 2599918 | A | 4/2022 | |
| GB | 2599918 | B | 3/2023 | |
| JP | 2012103050 | A | 5/2012 | |
| KR | 20080113982 | A * | 12/2008 | |
| KR | 101830298 | B1 * | 3/2018 | |
| KR | 102748001 | B1 * | 1/2025 | |
| RU | 177419 | U1 | 2/2018 | |
| WO | 2022079599 | A1 | 4/2022 | |

OTHER PUBLICATIONS

"Unmanned Aircraft bistatic LIDAR for CO2 col. density determination;" Gardi et al., 2014 IEEE Metrology for Aerospace (MetroAeroSpace) (2014, pp. 44-49); Aug. 15, 2014. (Year: 2014).*

"Comparative optical measurements of airspeed and aerosols on a DC-8 aircraft;" Bogue et al., ICIASF '95 Record. International Congress on Instrumentation in Aerospace Simulation Facilities (1995, pp. 56/1-5625); Jan. 1, 1995. (Year: 1995).*

Dobbins et al., "Systems and Methods for Diminishing Vehicle Contrails", U.S. Appl. No. 18/457,779, filed Aug. 29, 2023, pp. 1 through 31, Published: US.

European Patent Office, "Extended European Search Report", dated Jan. 7, 2025, from EP Application No. 24194120.2, from Foreign Counterpart to U.S. Appl. No. 18/457,779, pp. 1 through 9, Published: EP.

(56) References Cited

OTHER PUBLICATIONS

European Patent Office, "Extended European Search Report", dated Feb. 5, 2025, from EP Application No. 24193297.9, from Foreign Counterpart to U.S. Appl. No. 18/457,767, pp. 1 through 9, Published: EP.

U.S. Patent and Trademark Office, "Office Action", U.S. Appl. No. 18/457,779, dated Apr. 23, 2025, pp. 1 through 82, Published: US.

Martucci et al., "Validation of pure rotational Raman temperature data from the Raman Lidar for Meteorological Observations (RALMO) at Payerne", Atmospheric Measurement Techniques, vol. 14, Feb. 22, 2021, pp. 1333 through 1353, Published by Copernicus Publications on behalf of the European Geosciences Union.

Paoli et al., "Contrail Modeling and Simulation", Annual Review of Fluid Mechanics, vol. 48, Jan. 2016, pp. 393 through 427.

U.S. Patent and Trademark Office, "Final Office Action", U.S. Appl. No. 18/457,779, dated Sep. 24, 2025, pp. 1 through 66, Published: US.

U.S. Patent and Trademark Office, "Advisory Action", U.S. Appl. No. 18/457,779, dated Nov. 5, 2025, pp. 1 through 3, Published: US.

\* cited by examiner

SYSTEMS AND METHODS FOR DIMINISHING VEHICLE CONTRAILS

BACKGROUND

Aircraft jet engines generate soot and water vapor. When airborne, water vapor can condense as ice onto soot particles emitted from the aircraft jet engines, thus creating a condensation trail (contrail). Contrails, created in Earth's atmosphere, trap and absorb long wave radiation (or thermal radiation) emitted by the Earth or sources thereon. As a result, contrails created by aircraft jet engines can increase climate change, e.g., including global warming.

SUMMARY

In some aspects, the techniques described herein relate to a method for creating a flight path of a vehicle, the method including: obtaining humidity data, for at least one atmospheric geographic region, derived from a measurement only made by at least one light detection and ranging (LIDAR) transceiver all of which are on the vehicle; using the humidity data, determining a first atmospheric region in which the vehicle would generate a contrail if the vehicle travelled through the first atmospheric region; and using information about the first atmospheric region, generating the flight path of the vehicle which avoids the first atmospheric region in which the vehicle would generate the contrail if the vehicle travelled through the first atmospheric region, wherein the vehicle is configured to use the flight path to affect a vector velocity of the vehicle.

In some aspects, the techniques described herein relate to a non-transitory computer readable medium storing a program causing at least one processor of a non-certified computer to execute a process for creating a flight path of a vehicle, the process including: obtaining humidity data, for at least one atmospheric geographic region, derived from a measurement only made by at least one light detection and ranging (LIDAR) transceiver all of which are on the vehicle; using the humidity data, determining a first atmospheric region in which the vehicle would generate a contrail if the vehicle travelled through the first atmospheric region; and using information about the first atmospheric region, generating the flight path of the vehicle which avoids the first atmospheric region in which the vehicle would generate the contrail if the vehicle travelled through the first atmospheric region, wherein the vehicle is configured to use the flight path to affect a vector velocity of the vehicle.

In some aspects, the techniques described herein relate to an apparatus for creating a flight path of a vehicle, the apparatus including: at least one memory circuit; and at least one processor circuit communicatively coupled to the at least one memory circuit and configured to: obtain humidity data, for at least one atmospheric geographic region, derived from a measurement only made by at least one light detection and ranging (LIDAR) transceiver all of which are on the vehicle; using the humidity data, determine a first atmospheric region in which the vehicle would generate a contrail if the vehicle travelled through the first atmospheric region; and using information about the first atmospheric region, generate the flight path of the vehicle which avoids the first atmospheric region in which the vehicle would generate the contrail if the vehicle travelled through the first atmospheric region, wherein the vehicle is configured to use the flight path to affect a vector velocity of the vehicle.

BRIEF DESCRIPTION OF THE DRAWINGS

Comprehension of embodiments of the invention is facilitated by reading the following detailed description in conjunction with the annexed drawings, in which.

In accordance with common practice, the various described features are not drawn to scale but are drawn to emphasize features relevant to the present disclosure. Reference characters denote like elements throughout figures and text.

DETAILED DESCRIPTION

Figure 1:
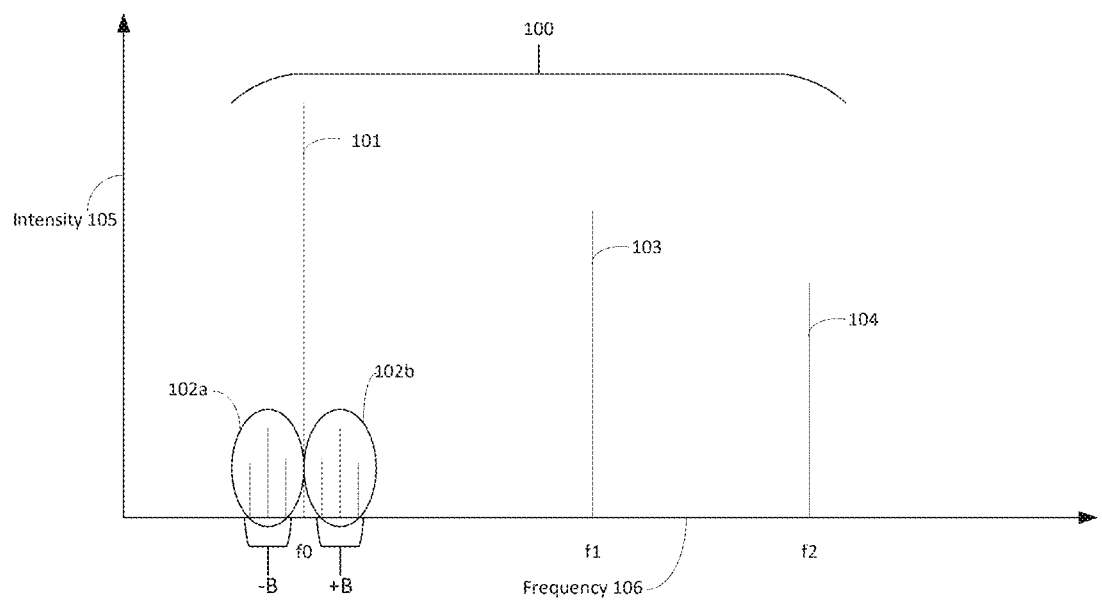
FIG. 1 illustrates a chart of frequency versus intensity for frequency components of a reflected optical signal received by a LIDAR transceiver.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

A technological improvement to a system for vehicle navigation is provided. The improvement diminishes a contribution to global warming by generating a flight path (generated flight path) or modifying the flight path (modified flight path) of a vehicle to avoid an atmospheric region in which the vehicle would create a contrail if the vehicle travelled through the atmospheric region. Flight path of a vehicle means a designated, e.g., atmospheric, route, e.g., to a destination or a waypoint, of the vehicle.

One or more light detection and ranging (LIDAR) transceivers may be located remotely from the vehicle and/or on the vehicle to provide measurement(s) from which weather data can be derived for one or more atmospheric regions through which the vehicle may travel. Optionally, the at least one LIDAR transceivers are only located remotely from the vehicle; optionally and alternatively, the at least one LIDAR transceivers are only located on the vehicle.

The atmospheric region is in the atmosphere of the Earth, and thus may also be referred to as an atmospheric region. The weather data of an atmospheric region, derived from LIDAR transceiver measurement(s), includes (a) humidity, and optionally (b) temperature, (c) turbulence (if any), and/or headwind (if any).[1] Turbulence means a chaotic change in pressure and flow velocity, e.g., in an atmospheric region. Headwind means a vector component of wind travelling in an opposite direction of the vehicle.

[1] Temperature, turbulence, and/or headwind may be determined using the same or different measurement(s) used to determine humidity.

Using the humidity data, and optionally temperature data, derived from LIDAR transceiver measurement(s) of an atmospheric region, it is determined whether the vehicle would create a contrail if the vehicle travelled through the atmospheric region. A Schmidt-Appleman criterion and/or one or more other techniques may be used to make such determination. The article, Paoli, Roberto, and Karim Shariff. "Contrail modeling and simulation." *Annual Review of Fluid Mechanics* 48 (2016), discloses techniques for determining whether a contrail will form if a vehicle traverses an atmospheric region including the Schmidt-Appleman criterion, and is incorporated by reference herein in its entirety. The principle two independent variables needed to determine whether a contrail would form are (a) humidity of the atmospheric region and (b) temperature of the atmospheric region. The temperature of an atmospheric region may be derived from LIDAR transceiver measurement(s) and/or temperature data, e.g., for the atmospheric region, from other sources. Optionally, such analysis may be performed in a processing system remotely located from the vehicle, e.g., terrestrially located.

Upon determining that there is an atmospheric region in which the vehicle would generate a contrail if it travelled through the atmospheric region, the system for vehicle navigation generates a flight path of the vehicle so that the vehicle avoids the atmospheric region in which the vehicle would generate a contrail. Optionally, the generated flight path may be a modification of a pre-existing flight path. Vehicle, as used herein, may be an aircraft, a spacecraft, or any other type of vehicle which can create a contrail in Earth's atmosphere.

To determine whether a contrail would form in an atmospheric region, the humidity (and optionally the temperature) of the atmospheric region can be derived from measurement(s) made by a LIDAR transceiver. The LIDAR transceiver transmits a transmitted optical signal to the atmospheric region. A portion of the transmitted optical signal, i.e., a reflected signal, is incident upon and reflected by particles, e.g., molecules and atoms, in the atmospheric region and received by the LIDAR transceiver. Excitation of the particles by the transmitted optical signal causes elastic scattering and inelastic scattering resulting in the reflected optical signal including respectively a portion of energy of the transmitted optical signal at a frequency spectrum of the transmitted optical signal and a portion of energy of the transmitted optical signal at a different, or shifted, frequency spectrum. Optionally, the LIDAR transceiver may steer the transmitted optical signal so as to be able to obtain measurements in different atmospheric regions.

FIG. 1 illustrates a chart of frequency 106 versus intensity 105 for frequency components of a reflected optical signal 100 received by a LIDAR transceiver. A first component 101 of the reflected optical signal 100 is at the carrier frequency f0 of the transmitted optical signal and is reflected by particles to the LIDAR transceiver by Mie and/or Rayleigh scattering in an atmospheric region upon which the transmitted optical signal is incident. The second component 103 of the reflected optical signal 100 is shifted to a first shifted frequency f1 due to inelastic scattering from nitrogen molecules in the atmospheric region upon which the transmitted optical signal is incident. The third component 104 of the reflected optical signal 100 is shifted to a second shifted frequency f2 due to inelastic scattering from water vapor molecules in the atmospheric region upon which the transmitted optical signal is incident. The first and the second shifted frequencies are known. Thus, the intensities of the second component 103 and the third component 104 can be readily determined, e.g., by detecting intensity at each of the first and the second shifted frequencies. Humidity can be determined from a ratio of the intensity of the third component 104 (corresponding to water vapor molecules) with respect to the intensity of the second component 103 (corresponding to nitrogen molecules).

A LIDAR transceiver may be used to measure a temperature of an atmospheric region in a variety of ways including differential absorption LIDAR (DIAL), high spectral resolution LIDAR (HSRL), a Rayleigh method, and a Raman technique. The article Martucci, G., Navas-Guzmán, F., Renaud, L., Romanens, G., Gamage, S. M., Hervo, M., Jeannet, P. & Haefele, A. (2021). Validation of pure rotational Raman temperature data from the Raman Lidar for Meteorological Observations (RALMO) at Payerne. *Atmospheric Measurement Techniques,* 14(2), 1333-1353 discloses an exemplary technique for characterizing humidity and temperature and is incorporated by reference herein in its entirety.

For pedagogical purposes, only a rotational Raman technique for determining temperature with a LIDAR transceiver will be further described herein. When the transmitted optical signal is incident on, e.g., oxygen and nitrogen, molecules in the atmospheric region, vibrations of the molecules cause inelastic scattering. As a result, a first set of frequency components 102a is generated in a first frequency band −B below first component 101 at the carrier frequency f0 and a second set of frequency components 102b is generated in a second frequency band +B above the first component 101 at the carrier frequency f0. Temperature can be derived from the relative amplitude of the rotational Raman lines in one or both of frequency band −B and frequency band +B.

Temperature in an atmospheric region may alternatively be measured by means other than LIDAR transceiver(s). Optionally, temperature data may be measured by a thermometer or a pitot static system, e.g., on another airborne vehicle, for example, another aircraft, a drone, or a weather balloon. Such data may be provided to the vehicle processing system 227a or the optional terrestrial processing system 227b by wireless or wired communications, e.g., from a central repository (or database), e.g., managed by a national weather service entity.

Figure 2A:
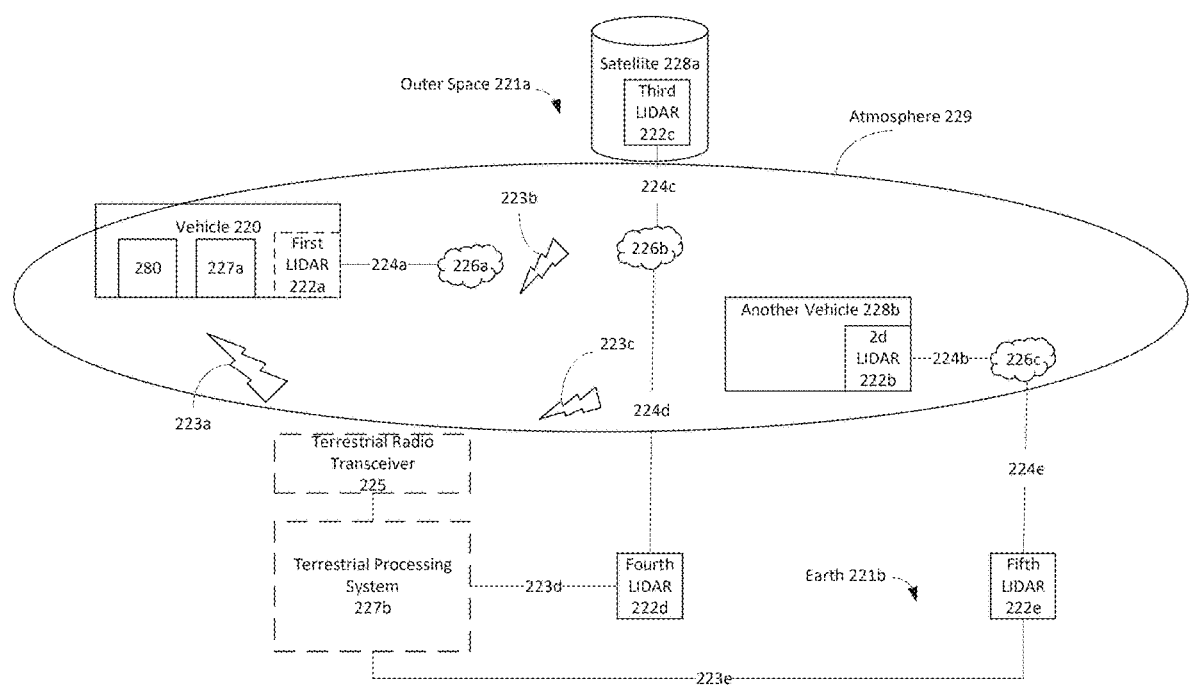
FIG. 2A illustrates a diagram of an exemplary vehicle in the Earth's atmosphere.

FIG. 2A illustrates a diagram of an exemplary vehicle 220 in the Earth's atmosphere 229. Using weather data (derived from measurements received from one or more LIDAR transceivers 222a, 222b, 222c, 222d, 222e[2]), one or more processing systems (or one or more processing circuitry), e.g., a vehicle processing system (or vehicle processing circuitry) 227a (on the vehicle 220) and/or a terrestrial processing system (or terrestrial processing circuitry) 227b, is configured to determine an atmospheric region to avoid, e.g., because travel by the vehicle 220 through the atmospheric region would cause a contrail to be formed in the atmospheric region.

[2] Optionally, one or more of the processing systems described herein is configured to receive the measurements from a LIDAR transceiver and to convert the measurements to weather data (e.g., using techniques described herein), or alternatively the LIDAR transceiver may convert the measurements to weather data (e.g., using techniques described herein) and provide the weather data to the one or more processing system described herein.

The vehicle 220 includes a vehicle radio transceiver 280, a vehicle processing system (or vehicle processing circuitry) 227a, and an optional first LIDAR transceiver 222a. The vehicle processing system 227a is configured to be communicatively coupled to the vehicle radio transceiver 280 to facilitate communications of information between the vehicle processing system 227a and other systems, e.g., the terrestrial processing system (for example through a terrestrial radio transceiver) or LIDAR transceiver(s) remotely from the vehicle 220.

Techniques for diminishing contrail generation, utilize one or more LIDAR transceivers 222a, 222b, 222c, 222d, 222e. Each LIDAR transceiver may be located remotely from or on the vehicle 220. A LIDAR transceiver 222b, 222c, 222d, 222e remotely located from the vehicle may be in outer space 221a, e.g., in a space craft, for example a satellite 228a, located in the Earth's atmosphere 229, e.g., in another airborne vehicle 228b such as an aircraft, for example a drone or a commercial aircraft, or located on one or more terrestrial places on Earth 221b. Each LIDAR transceiver is configured to measure one or more atmospheric regions 226a, 226b, 226c by transmitting a transmitted optical signal and receiving a reflected optical signal (collectively identified as transmitted/reflected optical signals 224a, 224b, 224c, 224d, 224e)

Figure 2B:
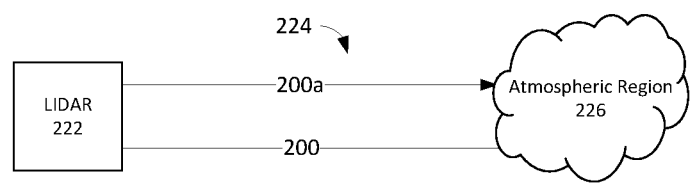
FIG. 2B illustrates a drawing of an exemplary transmitted/reflected optical signal.

FIG. 2B illustrates a drawing of an exemplary transmitted/reflected optical signal 224. The transmitted/reflected optical signal 224 includes a transmitted optical signal 200a (transmitted from a LIDAR transceiver 222 to an atmospheric region 226) and a reflected optical signal 200, reflected by the atmospheric region 226 and received by the LIDAR transceiver 222.

Returning to FIG. 2A, when the optional terrestrial processing system 227b is utilized, weather data (derived from LIDAR transceiver measurement(s)) or measurement(s) from one or more LIDAR transceivers are communicated through (a) wireless communication links 223a, 223b, 223c to the optional terrestrial processing system 227b through an optional terrestrial radio transceiver 225 and/or (b) terrestrial wired communications links 223d, 223e. The optional terrestrial processing system 227b is configured to determine if the atmospheric region, sensed by LIDAR transceiver(s), should be avoided, e.g., because the vehicle 220 would create a contrail in the atmospheric region.

Optionally, if the optional terrestrial processing system 227b determines that the atmospheric region is to be avoided, then the optional terrestrial processing system 227b is further configured to transmit, e.g., through the optional terrestrial radio transceiver 225, information describing such determined atmospheric region to the vehicle 220, e.g., the vehicle processing system 227a. In such a case, the vehicle processing system 227a is configured to receive such information, and, using such information, to generate a flight path of the vehicle so the vehicle 220 avoids such atmospheric region because the vehicle 220 would cause a contrail in the atmospheric region, or optionally, at least one of: because the headwind has a headwind larger than a headwind threshold level and because the atmospheric region has a turbulence greater than a turbulence threshold level. Optionally, the generated flight path is through atmospheric regions in each of which the vehicle 220 would not create a contrail, and optionally at least one of: does not have a headwind larger than the headwind threshold level and does not have a turbulence greater than the turbulence threshold level. Optionally, the generated flight path may be a modification of a pre-existing flight path which was previously received; in such case, the generated flight path may be referred to as a modified flight path.

Optionally, one or more of the LIDAR transceivers is configured to measure data from which can be derived a speed of headwinds in an atmospheric region and/or turbulence in the atmospheric region. A speed of headwinds in an atmospheric region may be, for example, determined using a LIDAR transceiver on an airborne vehicle in the atmospheric region by determining a Doppler shift in a frequency of the reflected optical signal from the frequency of the transmitted optical signal. The presence of turbulence in an atmospheric region can be determined by ascertaining a variation, e.g., a standard deviation, of the Doppler shift (described above) over a time period and determining if a variation, e.g., the standard variation, of the Doppler shift measurements during the time period exceeds a turbulence threshold level. Turbulence can also be detected, in the atmospheric region, by determining whether a variation, over the time period, of pressure, temperature, density, humidity, or backscatter (measured by a LIDAR transceiver, microphone(s), and/or an inertial management unit of an airborne vehicle) in the atmospheric region exceeds a corresponding threshold level. Further, turbulence may be ascertained by determining by ascertaining whether two or more of the aforementioned parameters each exceed their corresponding threshold level. Optionally, the optional terrestrial processing system 227b is further configured to determine that the determined atmospheric region should be further avoided because of headwinds or turbulence (using criteria described elsewhere herein), and to optionally transmit such information to the vehicle 220, e.g., the vehicle processing system 227a. Further, optionally, the optional terrestrial processing system 227b is further configured to transmit, e.g., through the optional terrestrial radio transceiver 225, weather data derived by the optional terrestrial processing system 227b from LIDAR transceiver measurement(s) or the LIDAR transceiver measurement(s) to the vehicle 220, e.g., the vehicle processing system 227a. Upon receipt of the determined atmospheric region, the vehicle 220, e.g., the vehicle processing system 227a[3], is configured to generate a flight path of the vehicle so that the vehicle 220 avoids the determined atmospheric region. Optionally, the generated flight path may be a modification of a pre-existing flight path.

[3] For example, the vehicle processing system 227a includes a flight management system in which the vehicle 220 stores the flight path of the vehicle and may optionally be configured to guide the vehicle 220 along the flight path by controlling control surface(s) and/or propulsion system(s) (e.g., jet engines of the vehicle 220.

Alternatively, the optional terrestrial processing system 227b does not transmit the information describing such determined atmospheric region to the vehicle 220, e.g., the vehicle processing system 227a, to allow the vehicle 220 to avoid the determined atmospheric region. Rather, the optional terrestrial processing system 227b is further configured to, using such information, to generate a flight path of the vehicle 220 so the vehicle 220 avoids such determined atmospheric region. Optionally, the generated flight path may be a modification of a pre-existing flight path. Then, the optional terrestrial processing system 227b is further configured to transmit such flight path to the vehicle, e.g., to the vehicle processing system 227a; optionally, the vehicle processing system 227a includes a flight management system in which the vehicle 220 stores the flight path of the vehicle and may optionally be configured to guide the vehicle 220 along the flight path by controlling control surface(s) and/or propulsion system(s) (e.g., jet engines of the vehicle 220. Optionally, the optional terrestrial processing system 227b does not transmit the Doppler shift measurement(s) by LIDAR transceiver(s) to the vehicle 220, the vehicle processing system 227a. Rather the optional terrestrial processing system 227b is further configured to, using such information, to generate a flight path of the vehicle so the vehicle 220 avoids the determined atmospheric region (a) with headwinds larger than other atmospheric regions, e.g., through which the vehicle 220 is subsequently rerouted and/or (b) with turbulence. Optionally, the generated flight path may be a modification of a pre-existing flight path. Further, optionally, the optional terrestrial processing system 227b is further configured to transmit, e.g., through the optional terrestrial radio transceiver 225, such generated flight path of the vehicle to the vehicle 220, e.g., the vehicle processing system 227a. The vehicle 220, e.g., the vehicle processing system 227a, is configured to use the generated flight path or generated modified flight path are configured to be used to affect a vector velocity of the vehicle 220. Optionally, the vehicle processing system 227a is configured to receive LIDAR transceiver measurement(s) (directly and/or through the optional terrestrial radio transceiver 225 and/or the optional terrestrial processing system 227b) and to determine whether an atmospheric region is to be avoided, e.g., using some or all of the same criteria described elsewhere herein with respect to the optional terrestrial processing system 227b.

Figure 2C:
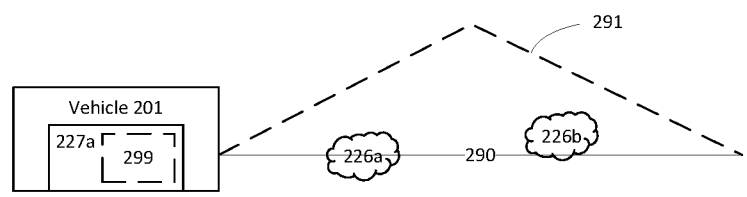
FIG. 2C illustrates a drawing of an exemplary embodiment of a flight path and a modified flight path altered to avoid atmospheric regions in which a vehicle would create a contrail.

FIG. 2C illustrates a drawing of an exemplary embodiment of a flight path 290 and a modified flight path 291 altered to avoid atmospheric regions 226a, 226b in which a vehicle 201 would create a contrail. Thus, for example, the flight management system 299, upon receiving or generating a modified flight path 291, would cause the vehicle 201 to travel along the modified flight path 291 instead of continuing to travel along the flight path 290 which was modified to create the modified flight path 291.

Figure 3:
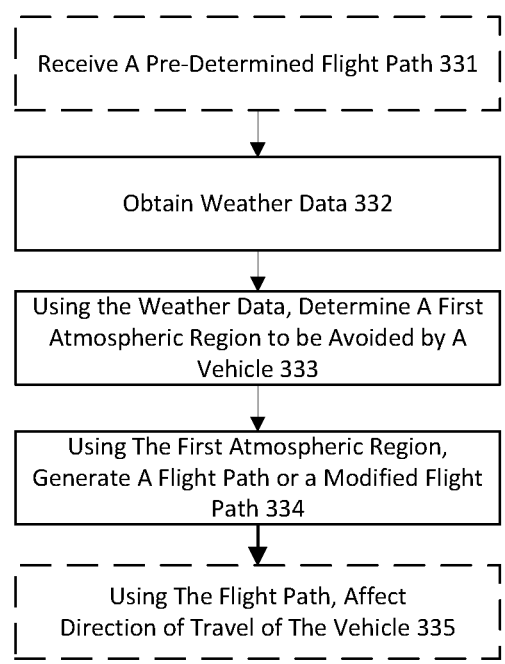
FIG. 3 illustrates one embodiment of a flow diagram of a method for generating a vehicle flight path so that the vehicle avoids an atmospheric region, in which a contrail would be formed by the vehicle if it travelled through the atmospheric region.

FIG. 3 illustrates one embodiment of a flow diagram of a method 330 for generating a vehicle flight path so that the vehicle avoids an atmospheric region, in which a contrail would be formed by the vehicle if it travelled through the atmospheric region. Optionally, method 330 is executed by software in the terrestrial or the vehicle processing system. To the extent that the methods shown in any Figures are described herein as being implemented with any of the systems illustrated herein, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In optional block 331, a pre-determined flight path is received. In block 332, weather data, e.g., humidity data, (derived, e.g., only, from at least one measurement of at least one LIDAR transceiver) of at least one atmospheric region, is obtained, e.g., (a) from the vehicle processing system and/or the terrestrial processing system or (b) directly, from at least one LIDAR transceiver, wherein each LIDAR transceiver is on the vehicle or remote from the vehicle, e.g., terrestrially located, on another airborne vehicle, or in a vehicle in outer space. The weather data may be obtained using techniques described elsewhere herein or other techniques. Optionally, the weather data includes at least one of: headwind data and turbulence data.

In block 333, using the weather data that is the humidity data, a first atmospheric region (to be avoided by the vehicle) is determined, where the vehicle would generate a contrail if the vehicle travelled through the first atmospheric region. Optionally, using at least one of headwind data and turbulence data, a second atmospheric region is determined where at least one of: the headwinds are greater than a headwind threshold level and the turbulence is greater than a turbulence threshold level.

In block 334, using information about the first atmospheric region[4], a flight path (if no pre-determined flight path was received and no flight path was previously generated) or a modified flight path (if a pre-determine flight path was received or a flight path was previously generated) is determined so that the vehicle avoids the first atmospheric region in which the vehicle would generate a contrail if the vehicle traveled through the first atmospheric region. Optionally, the flight path or the modified flight path is generated using information about the second atmospheric region (if determined) and which avoids the second atmospheric region. A determined flight path or a determined modified flight path are configured to be used by the vehicle to affect a vector velocity of the vehicle. In optional block 335, using the flight path or the determined modified flight path, a direction of travel (e.g., a change of direction of travel) of the vehicle is affected.

[4]E.g., a description of the region in geographic coordinates.

Each processing system (or circuitry) described herein may be implemented by at least one processor circuit electrically coupled to at least one memory circuit. The processor circuit(s) described herein may include one or more microprocessors, microcontrollers, digital signal processing (DSP) elements, application-specific integrated circuits (ASICs), and/or field programmable gate arrays (FPGAs). In this exemplary embodiment, processor circuitry includes or functions with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures.

The memory circuit(s) described herein can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk-Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Combinations of the above are also included within the scope of computer readable media.

Methods set forth herein can be implemented in computer readable instructions, such as program modules or applications, which may be stored in the computer readable medium that is part of (optionally the memory circuitry) or communicatively coupled to the processing circuitry, and executed by the processing circuitry, optionally the processor circuitry. Generally, program modules or applications include routines, programs, objects, data components, data structures, algorithms, and the like, which perform particular tasks or implement particular abstract data types.

Example Embodiments

Example 1 includes a method for creating a flight path of a vehicle, the method comprising: obtaining humidity data, for at least one atmospheric geographic region, derived from a measurement only made by at least one light detection and ranging (LIDAR) transceiver all of which are remote from the vehicle; using the humidity data, determining a first atmospheric region in which the vehicle would generate a contrail if the vehicle travelled through the first atmospheric region; and using information about the first atmospheric region, generating the flight path of the vehicle which avoids the first atmospheric region in which the vehicle would generate the contrail if the vehicle travelled through the first atmospheric region, wherein the vehicle is configured to use the flight path to affect a vector velocity of the vehicle.

Example 2 includes the method of Example 1, wherein obtaining the humidity data further comprises obtaining temperature data, for the at least one atmospheric geographic region, derived from the measurement only made by the at least one LIDAR transceiver; wherein the first atmospheric region in which the vehicle would generate the contrail if the vehicle travelled through the first atmospheric region is determined using both the humidity data and the temperature data.

Example 3 includes the method of any of Examples 1-2, further comprising receiving a pre-determined flight path of the vehicle; wherein generating the flight path of the vehicle comprises modifying the pre-determined flight path to avoid the first atmospheric region in which the vehicle would generate the contrail if the vehicle travelled through the first atmospheric region.

Example 4 includes the method any of Examples 1-3, further comprising using the flight path, affecting the vector velocity of the vehicle to avoid the first atmospheric region in which the vehicle would generate the contrail if the vehicle travelled through the first atmospheric region.

Example 5 includes the method of any of Examples 1-4, further comprising transmitting the flight path of the vehicle from a terrestrial processing system, remote from the vehicle, to a vehicle processing system on the vehicle; wherein generating the flight path further comprises generating the flight path with the terrestrial processing system remote from the vehicle.

Example 6 includes the method of any of Examples 1-5, further comprising: receiving at least one of headwind data and turbulence data, for at least one atmospheric geographic location, derived from the measurement only made by the at least one light detection and ranging (LIDAR); and using the at least one of headwind data and turbulence data, determining a second atmospheric region which there is at least one of: (a) a headwind is greater than a headwind threshold level and (b) turbulence is greater than a turbulence threshold level; wherein generating the flight path of the vehicle further comprises generating the flight path of the vehicle which also avoids the second atmospheric region.

Example 7 includes the method of any of Examples 5-6, further comprising receiving a pre-determined flight path of the vehicle; wherein generating the flight path of the vehicle comprises modifying the pre-determined flight path to avoid the first and the second atmospheric regions.

Example 8 includes a non-transitory computer readable medium storing a program causing at least one processor of a non-certified computer to execute a process for creating a flight path of a vehicle, the process comprising: obtaining humidity data, for at least one atmospheric geographic region, derived from a measurement only made by at least one light detection and ranging (LIDAR) transceiver all of which are remote from the vehicle; using the humidity data, determining a first atmospheric region in which the vehicle would generate a contrail if the vehicle travelled through the first atmospheric region; and using information about the first atmospheric region, generating the flight path of the vehicle which avoids the first atmospheric region in which the vehicle would generate the contrail if the vehicle travelled through the first atmospheric region, wherein the vehicle is configured to use the flight path to affect a vector velocity of the vehicle.

Example 9 includes the non-transitory computer readable medium of Example 8, wherein obtaining the humidity data further comprises obtaining temperature data, for the at least one atmospheric geographic region, derived from the measurement only made by the at least one LIDAR transceiver; wherein the first atmospheric region in which the vehicle would generate the contrail if the vehicle travelled through the first atmospheric region is determined using both the humidity data and the temperature data.

Example 10 includes the non-transitory computer readable medium of any of Examples 8-9, wherein the process further comprises receiving a pre-determined flight path of the vehicle; wherein generating the flight path of the vehicle comprises modifying the pre-determined flight path to avoid the first atmospheric region in which the vehicle would generate the contrail if the vehicle travelled through the first atmospheric region.

Example 11 includes the non-transitory computer readable medium of any of Examples 8-10, wherein the process further comprises using the flight path, cause a change in the vector velocity of the vehicle to avoid the first atmospheric region in which the vehicle would generate the contrail if the vehicle travelled through the first atmospheric region.

Example 12 includes the non-transitory computer readable medium of any of Examples 8-11, wherein the process further comprises causing transmission the flight path of the vehicle from a terrestrial processing system, remote from the vehicle, to a vehicle processing system on the vehicle; wherein generating the flight path further comprises generating the flight path with the terrestrial processing system remote from the vehicle.

Example 13 includes the non-transitory computer readable medium of any of Examples 8-12, wherein the process further comprises: receiving at least one of headwind data and turbulence data, for at least one atmospheric geographic location, derived from the measurement only made by the at least one light detection and ranging (LIDAR) transceiver; and using the at least one of headwind data and turbulence data, determining a second atmospheric region which there is at least one of: (a) a headwind is greater than a headwind threshold level and (b) turbulence is greater than a turbulence threshold level; wherein generating the flight path of the vehicle further comprises generating the flight path of the vehicle which also avoids the second atmospheric region.

Example 14 includes the non-transitory computer readable medium of Example 12-13, wherein the process further comprises: receiving a pre-determined flight path of the vehicle; wherein generating the flight path of the vehicle comprises modifying the pre-determined flight path to avoid the first and the second atmospheric regions.

Example 15 includes an apparatus for creating a flight path of a vehicle, the apparatus comprising; at least one memory circuit; and at least one processor circuit communicatively coupled to the at least one memory circuit and configured to: obtain humidity data, for at least one atmospheric geographic region, derived from a measurement only made by at least one light detection and ranging (LIDAR) transceiver all of which are remote from the vehicle; using the humidity data, determine a first atmospheric region in which the vehicle would generate a contrail if the vehicle travelled through the first atmospheric region; and using information about the first atmospheric region, generate the flight path of the vehicle which avoids the first atmospheric region in which the vehicle would generate the contrail if the vehicle travelled through the first atmospheric region, wherein the vehicle is configured to use the flight path to affect a vector velocity of the vehicle.

Example 16 includes the apparatus of Example 15, wherein obtain the humidity data further comprises obtain temperature data, for the at least one atmospheric geographic region, derived from the measurement only made by the at least one LIDAR transceiver; wherein the first atmospheric region in which the vehicle would generate the contrail if the vehicle travelled through the first atmospheric region is determined using both the humidity data and the temperature data.

Example 17 includes the apparatus of any of Examples 15-16, wherein the at least one processor circuit is further configured to receive a pre-determined flight path of the vehicle; wherein generate the flight path of the vehicle comprises modify the pre-determined flight path to avoid the first atmospheric region in which the vehicle would generate the contrail if the vehicle travelled through the first atmospheric region.

Example 18 includes the apparatus of any of Examples 15-17, wherein the at least one processor circuit is further configured to, using the flight path, cause a change in the vector velocity of the vehicle to avoid the first atmospheric region in which the vehicle would generate the contrail if the vehicle travelled through the first atmospheric region.

Example 19 includes the apparatus of any of Examples 15-18, wherein the at least one processor circuit is further configured to: receive at least one of headwind data and turbulence data, for at least one atmospheric geographic location, derived from the measurement only made by the at least one light detection and ranging (LIDAR) transceiver; and using the at least one of headwind data and turbulence data, determine a second atmospheric region which there is at least one of: (a) a headwind is greater than a headwind threshold level and (b) turbulence is greater than a turbulence threshold level; wherein generate the flight path of the vehicle further comprises generate the flight path of the vehicle which also avoids the second atmospheric region.

Example 20 includes the apparatus of any of Examples 15-19, wherein the at least one processor circuit comprises one or more microprocessors, microcontrollers, digital signal processors, application-specific integrated circuits, and/or field programmable gate arrays.

Example 21 includes a method for creating a flight path of a vehicle, the method comprising: obtaining humidity data, for at least one atmospheric geographic region, derived from a measurement only made by at least one light detection and ranging (LIDAR) transceiver all of which are on the vehicle; using the humidity data, determining a first atmospheric region in which the vehicle would generate a contrail if the vehicle travelled through the first atmospheric region; and using information about the first atmospheric region, generating the flight path of the vehicle which avoids the first atmospheric region in which the vehicle would generate the contrail if the vehicle travelled through the first atmospheric region, wherein the vehicle is configured to use the flight path to affect a vector velocity of the vehicle.

Example 22 includes the method of Example 21, wherein obtaining the humidity data further comprises obtaining temperature data, for the at least one atmospheric geographic region, derived from the measurement only made by the at least one LIDAR transceiver; wherein the first atmospheric region in which the vehicle would generate the contrail if the vehicle travelled through the first atmospheric region is determined using both the humidity data and the temperature data.

Example 23 includes the method of any of Examples 21-22, further comprising receiving a pre-determined flight path of the vehicle; wherein generating the flight path of the vehicle comprises modifying the pre-determined flight path to avoid the first atmospheric region in which the vehicle would generate the contrail if the vehicle travelled through the first atmospheric region.

Example 24 includes the method of any of Examples 21-23, further comprising using the flight path, affecting the vector velocity of the vehicle to avoid the first atmospheric region in which the vehicle would generate the contrail if the vehicle travelled through the first atmospheric region.

Example 25 includes the method of any of Examples 21-24, further comprising transmitting the flight path of the vehicle from a terrestrial processing system, remote from the vehicle, to a vehicle processing system on the vehicle; wherein generating the flight path further comprises generating the flight path with the terrestrial processing system remote from the vehicle.

Example 26 includes the method of any of Examples 21-25, further comprising: receiving at least one of headwind data and turbulence data, for at least one atmospheric geographic location, derived from the measurement only made by the at least one light detection and ranging (LIDAR) transceiver; and using the at least one of headwind data and turbulence data, determining a second atmospheric region which there is at least one of: (a) a headwind is greater than a headwind threshold level and (b) turbulence is greater than a turbulence threshold level; wherein generating the flight path of the vehicle further comprises generating the flight path of the vehicle which also avoids the second atmospheric region.

Example 27 includes the method of any of Examples 25-26, further comprising receiving a pre-determined flight path of the vehicle; wherein generating the flight path of the vehicle comprises modifying the pre-determined flight path to avoid the first and the second atmospheric regions.

Example 28 includes a non-transitory computer readable medium storing a program causing at least one processor of a non-certified computer to execute a process for creating a flight path of a vehicle, the process comprising: obtaining humidity data, for at least one atmospheric geographic region, derived from a measurement only made by at least one light detection and ranging (LIDAR) transceiver all of which are on the vehicle; using the humidity data, determining a first atmospheric region in which the vehicle would generate a contrail if the vehicle travelled through the first atmospheric region; and using information about the first atmospheric region, generating the flight path of the vehicle which avoids the first atmospheric region in which the vehicle would generate the contrail if the vehicle travelled through the first atmospheric region, wherein the vehicle is configured to use the flight path to affect a vector velocity of the vehicle.

Example 29 includes the non-transitory computer readable medium of Example 28, wherein obtaining the humidity data further comprises obtaining temperature data, for the at least one atmospheric geographic region, derived from the measurement only made by the at least one LIDAR transceiver; wherein the first atmospheric region in which the vehicle would generate the contrail if the vehicle travelled through the first atmospheric region is determined using both the humidity data and the temperature data.

Example 30 includes the non-transitory computer readable medium of any of Examples 28-29, wherein the process further comprises receiving a pre-determined flight path of the vehicle; wherein generating the flight path of the vehicle comprises modifying the pre-determined flight path to avoid the first atmospheric region in which the vehicle would generate the contrail if the vehicle travelled through the first atmospheric region.

Example 31 includes the non-transitory computer readable medium of any of Examples 28-30, wherein the process further comprises using the flight path, cause a change in the vector velocity of the vehicle to avoid the first atmospheric region in which the vehicle would generate the contrail if the vehicle travelled through the first atmospheric region.

Example 32 includes the non-transitory computer readable medium of any of Examples 28-31, wherein the process further comprises causing transmission of the flight path of the vehicle from a terrestrial processing system, remote from the vehicle, to a vehicle processing system on the vehicle; wherein generating the flight path further comprises generating the flight path with the terrestrial processing system remote from the vehicle.

Example 33 includes the non-transitory computer readable medium of any of Examples 28-32, wherein the process further comprises: receiving at least one of headwind data and turbulence data, for at least one atmospheric geographic location, derived from the measurement only made by the at least one light detection and ranging (LIDAR) transceiver; and using the at least one of headwind data and turbulence data, determining a second atmospheric region which there is at least one of: (a) a headwind is greater than a headwind threshold level and (b) turbulence is greater than a turbulence threshold level; wherein generating the flight path of the vehicle further comprises generating the flight path of the vehicle which also avoids the second atmospheric region.

Example 34 includes the non-transitory computer readable medium of any of Examples 32-33, wherein the process further comprises: receiving a pre-determined flight path of the vehicle; wherein generating the flight path of the vehicle comprises modifying the pre-determined flight path to avoid the first and the second atmospheric regions.

Example 35 includes an apparatus for creating a flight path of a vehicle, the apparatus comprising: at least one memory circuit; and at least one processor circuit communicatively coupled to the at least one memory circuit and configured to: obtain humidity data, for at least one atmospheric geographic region, derived from a measurement only made by at least one light detection and ranging (LIDAR) transceiver all of which are on the vehicle; using the humidity data, determine a first atmospheric region in which the vehicle would generate a contrail if the vehicle travelled through the first atmospheric region; and using information about the first atmospheric region, generate the flight path of the vehicle which avoids the first atmospheric region in which the vehicle would generate the contrail if the vehicle travelled through the first atmospheric region, wherein the vehicle is configured to use the flight path to affect a vector velocity of the vehicle.

Example 36 includes the apparatus of Examples 35, wherein obtain the humidity data further comprises obtain temperature data, for the at least one atmospheric geographic region, derived from the measurement only made by the at least one LIDAR transceiver; wherein the first atmospheric region in which the vehicle would generate the contrail if the vehicle travelled through the first atmospheric region is determined using both the humidity data and the temperature data.

Example 37 includes the apparatus of any of Examples 35-36, wherein the at least one processor circuit is further configured to receive a pre-determined flight path of the vehicle; wherein generate the flight path of the vehicle comprises modify the pre-determined flight path to avoid the first atmospheric region in which the vehicle would generate the contrail if the vehicle travelled through the first atmospheric region.

Example 38 includes the apparatus of any of Examples 35-37, wherein the at least one processor circuit is further configured to, using the flight path, cause a change in the vector velocity of the vehicle to avoid the first atmospheric region in which the vehicle would generate the contrail if the vehicle travelled through the first atmospheric region.

Example 39 includes the apparatus of any of Examples 35-38, wherein the at least one processor circuit is further configured to: receive at least one of headwind data and turbulence data, for at least one atmospheric geographic location, derived from the measurement only made by the at least one light detection and ranging (LIDAR) transceiver; and using the at least one of headwind data and turbulence data, determine a second atmospheric region which there is at least one of: (a) a headwind is greater than a headwind threshold level and (b) turbulence is greater than a turbulence threshold level; wherein generate the flight path of the vehicle further comprises generate the flight path of the vehicle which also avoids the second atmospheric region.

Example 40 includes the apparatus of any of Examples 35-39, wherein the at least one processor circuit comprises one or more microprocessors, microcontrollers, digital signal processors, application-specific integrated circuits, and/or field programmable gate arrays.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

The invention claimed is:

1. A method for creating a flight path of a vehicle, the method comprising:

obtaining humidity data, for at least one atmospheric geographic region, derived from a measurement only made by at least one light detection and ranging (LIDAR) transceiver all of which are on the vehicle;

using the humidity data, determining a first atmospheric region in which the vehicle would generate a contrail if the vehicle travelled through the first atmospheric region; and using information about the first atmospheric region, generating the flight path of the vehicle which avoids the first atmospheric region in which the vehicle would generate the contrail if the vehicle travelled through the first atmospheric region;

changing, using the flight path of the vehicle which avoids the first atmospheric region in which the vehicle would generate the contrail if the vehicle travelled through the first atmospheric region, a vector velocity of the vehicle to avoid the first atmospheric region in which the vehicle would generate the contrail if the vehicle travelled through the first atmospheric region;

receiving at least one of headwind data and turbulence data, for at least one atmospheric geographic location, derived from the measurement only made by the at least one light detection and ranging (LIDAR) transceiver; and using the at least one of headwind data and turbulence data, determining a second atmospheric region which there is at least one of: (a) a headwind is greater than a headwind threshold level and (b) turbulence is greater than a turbulence threshold level;

wherein generating the flight path of the vehicle further comprises generating the flight path of the vehicle which also avoids the second atmospheric region.

2. The method of claim 1, wherein obtaining the humidity data further comprises obtaining the humidity data and temperature data, for the at least one atmospheric geographic region, derived from the measurement only made by the at least one LIDAR transceiver;

wherein the first atmospheric region in which the vehicle would generate the contrail if the vehicle travelled through the first atmospheric region is determined using both the humidity data and the temperature data.

3. The method of claim 1, further comprising receiving a pre-determined flight path of the vehicle;

wherein generating the flight path of the vehicle comprises modifying the pre-determined flight path to avoid the first atmospheric region in which the vehicle would generate the contrail if the vehicle travelled through the first atmospheric region.

4. The method of claim 1, further comprising transmitting the flight path of the vehicle from a terrestrial processing system, remote from the vehicle, to a vehicle processing system on the vehicle;

wherein generating the flight path further comprises generating the flight path with the terrestrial processing system remote from the vehicle.

5. The method of claim 1, further comprising receiving a pre-determined flight path of the vehicle;

wherein generating the flight path of the vehicle comprises modifying the pre-determined flight path to avoid the first and the second atmospheric regions.

6. A non-transitory computer readable medium storing a program causing at least one processor of a computer to execute a process for creating a flight path of a vehicle, the process comprising:

obtaining humidity data, for at least one atmospheric geographic region, derived from a measurement only made by at least one light detection and ranging (LIDAR) transceiver all of which are on the vehicle;

using the humidity data, determining a first atmospheric region in which the vehicle would generate a contrail if the vehicle travelled through the first atmospheric region;

using information about the first atmospheric region, generating the flight path of the vehicle which avoids the first atmospheric region in which the vehicle would generate the contrail if the vehicle travelled through the first atmospheric region; and causing a change, using the flight path of the vehicle which avoids the first atmospheric region in which the vehicle would generate the contrail if the vehicle travelled through the first atmospheric region, to a vector velocity of the vehicle to avoid the first atmospheric region in which the vehicle would generate the contrail if the vehicle travelled through the first atmospheric region;

receiving at least one of headwind data and turbulence data, for at least one atmospheric geographic location, derived from the measurement only made by the at least one light detection and ranging (LIDAR) transceiver; and using the at least one of headwind data and turbulence data, determining a second atmospheric region which there is at least one of: (a) a headwind is greater than a headwind threshold level and (b) turbulence is greater than a turbulence threshold level;

wherein generating the flight path of the vehicle further comprises generating the flight path of the vehicle which also avoids the second atmospheric region.

7. The non-transitory computer readable medium of claim 6, wherein obtaining the humidity data further comprises obtaining the humidity data and temperature data, for the at least one atmospheric geographic region, derived from the measurement only made by the at least one LIDAR transceiver;

wherein the first atmospheric region in which the vehicle would generate the contrail if the vehicle travelled through the first atmospheric region is determined using both the humidity data and the temperature data.

8. The non-transitory computer readable medium of claim 6, wherein the process further comprises receiving a pre-determined flight path of the vehicle;

wherein generating the flight path of the vehicle comprises modifying the pre-determined flight path to avoid the first atmospheric region in which the vehicle would generate the contrail if the vehicle travelled through the first atmospheric region.

9. The non-transitory computer readable medium of claim 6, wherein the process further comprises causing transmission of the flight path of the vehicle from a terrestrial processing system, remote from the vehicle, to a vehicle processing system on the vehicle;

wherein generating the flight path further comprises generating the flight path with the terrestrial processing system remote from the vehicle.

10. The non-transitory computer readable medium of claim 6, wherein the process further comprises:

receiving a pre-determined flight path of the vehicle;

wherein generating the flight path of the vehicle comprises modifying the pre-determined flight path to avoid the first and the second atmospheric regions.

11. An apparatus for creating a flight path of a vehicle, the apparatus comprising;

at least one memory circuit; and at least one processor circuit communicatively coupled to the at least one memory circuit and configured to:

obtain humidity data, for at least one atmospheric geographic region, derived from a measurement only made by at least one light detection and ranging (LIDAR) transceiver all of which are on the vehicle;

using the humidity data, determine a first atmospheric region in which the vehicle would generate a contrail if the vehicle travelled through the first atmospheric region;

using information about the first atmospheric region, generate the flight path of the vehicle which avoids the first atmospheric region in which the vehicle would generate the contrail if the vehicle travelled through the first atmospheric region; and cause, using the flight path of the vehicle which avoids the first atmospheric region in which the vehicle would generate the contrail if the vehicle travelled through the first atmospheric region, a change to a vector velocity of the vehicle to avoid the first atmospheric region in which the vehicle would generate the contrail if the vehicle travelled through the first atmospheric region;

receive at least one of headwind data and turbulence data, for at least one atmospheric geographic location, derived from the measurement only made by the at least one light detection and ranging (LIDAR) transceiver; and using the at least one of headwind data and turbulence data, determine a second atmospheric region which there is at least one of: (a) a headwind is greater than a headwind threshold level and (b) turbulence is greater than a turbulence threshold level;

wherein generate the flight path of the vehicle further comprises generate the flight path of the vehicle which also avoids the second atmospheric region.

12. The apparatus of claim 11, wherein obtain the humidity data further comprises obtain temperature data, for the at least one atmospheric geographic region, derived from the measurement only made by the at least one LIDAR transceiver;

wherein the first atmospheric region in which the vehicle would generate the contrail if the vehicle travelled through the first atmospheric region is determined using both the humidity data and the temperature data.

13. The apparatus of claim 11, wherein the at least one processor circuit is further configured to receive a pre-determined flight path of the vehicle;

wherein generate the flight path of the vehicle comprises modify the pre-determined flight path to avoid the first atmospheric region in which the vehicle would generate the contrail if the vehicle travelled through the first atmospheric region.

14. The apparatus of claim 11, wherein the at least one processor circuit comprises one or more microprocessors, microcontrollers, digital signal processors, application-specific integrated circuits, and/or field programmable gate arrays.

* * * * *